United States Patent
Lehmann et al.

(10) Patent No.: US 7,031,816 B2
(45) Date of Patent: Apr. 18, 2006

(54) ACTIVE ROLLOVER PROTECTION

(75) Inventors: Kurf Stouffer Lehmann, Clarkston, MI (US); Brian L. Hildebrand, Goodrich, MI (US); Clinton Schumann, Royal Oak, MI (US); Geoffrey Burke Bauer, Northville, MI (US)

(73) Assignee: Continental Teves, Inc., Augurn Hills, MI (US)

( * ) Notice: Subject to any disclaimer, the term of this patent is extended or adjusted under 35 U.S.C. 154(b) by 70 days.

(21) Appl. No.: 10/806,535

(22) Filed: Mar. 23, 2004

(65) Prior Publication Data

US 2005/0216154 A1   Sep. 29, 2005

(51) Int. Cl.
G06F 17/00 (2006.01)
(52) U.S. Cl. .................................... 701/48; 280/5.507
(58) Field of Classification Search ................. 701/45, 701/36, 41, 48, 70, 46; 280/5.507, 5.506
See application file for complete search history.

(56) References Cited

U.S. PATENT DOCUMENTS

| | | | |
|---|---|---|---|
| 5,742,918 A | 4/1998 | Ashrafi et al. | |
| 5,742,919 A | 4/1998 | Ashrafi et al. | |
| 5,787,375 A | 7/1998 | Madau et al. | |
| 5,790,966 A | 8/1998 | Madau et al. | |
| 5,809,434 A | 9/1998 | Ashrafi et al. | |
| 5,852,787 A | 12/1998 | Fodor et al. | |
| 5,948,027 A | 9/1999 | Oliver, Jr. et al. | |
| 5,971,503 A | 10/1999 | Joyce et al. | |
| 6,121,873 A * | 9/2000 | Yamada et al. ............. | 340/440 |
| 6,122,568 A | 9/2000 | Madau et al. | |
| 6,158,274 A | 12/2000 | Guo et al. | |
| 6,169,939 B1 | 1/2001 | Raad et al. | |
| 6,220,095 B1 | 4/2001 | Fennel et al. | |
| 6,233,505 B1 | 5/2001 | Kranz et al. | |
| 6,249,721 B1 | 6/2001 | Lohberg et al. | |
| 6,263,261 B1 | 7/2001 | Brown et al. | |
| 6,282,474 B1 | 8/2001 | Chou et al. | |
| 6,324,446 B1 | 11/2001 | Brown et al. | |
| 6,327,526 B1 | 12/2001 | Hagan | |
| 6,330,496 B1 | 12/2001 | Latarnik et al. | |
| 6,332,104 B1 | 12/2001 | Brown et al. | |
| 6,338,012 B1 | 1/2002 | Brown et al. | |
| 6,347,541 B1 | 2/2002 | Maleki | |
| 6,351,694 B1 | 2/2002 | Tseng et al. | |
| 6,353,777 B1 | 3/2002 | Harmison et al. | |
| 6,356,188 B1 | 3/2002 | Meyers et al. | |
| 6,364,435 B1 | 4/2002 | Gronau et al. | |
| 6,366,844 B1 | 4/2002 | Woywod et al. | |

(Continued)

OTHER PUBLICATIONS

English Abstract and (3) Sheets Drawings from WO 01/12483 A1; Published Feb. 22, 2001; Title: "Method and Device For Measuring Status Variables of a Vehicle".

*Primary Examiner*—Michael J. Zanelli
(74) *Attorney, Agent, or Firm*—Brinks Hofer Gilson & Lione

(57) ABSTRACT

A system and method protects against rollover in a vehicle by employing an array of linear acceleration sensors. A control module includes, among other things, a model of the vehicle dynamics and a model of the array of sensors. A state vector is estimated based on the detected accelerations, the model of the vehicle dynamics and the model of the sensors. A control signal is generated based on the state vector, and the roll moment of the vehicle is reduced based on the control signal.

32 Claims, 3 Drawing Sheets

U.S. PATENT DOCUMENTS

| | | |
|---|---|---|
| 6,374,163 B1 | 4/2002 | Lou et al. |
| 6,397,127 B1 | 5/2002 | Meyers et al. |
| 6,409,286 B1 | 6/2002 | Fennel |
| 6,424,907 B1 | 7/2002 | Rieth et al. |
| 6,434,451 B1 | 8/2002 | Lohberg et al. |
| 6,435,626 B1 | 8/2002 | Kostadina |
| 6,438,464 B1 | 8/2002 | Woywod et al. |
| 6,471,218 B1 | 10/2002 | Burdock et al. |
| 6,477,480 B1 | 11/2002 | Tseng et al. |
| 6,496,758 B1 | 12/2002 | Rhode et al. |
| 6,526,334 B1 | 2/2003 | Latarnik et al. |
| 6,526,342 B1 | 2/2003 | Burdock et al. |
| 6,529,803 B1 | 3/2003 | Meyers et al. |
| 6,554,293 B1 | 4/2003 | Fennel et al. |
| 6,556,908 B1 | 4/2003 | Lu et al. |
| 6,593,849 B1 | 7/2003 | Chubb et al. |
| 6,614,343 B1 | 9/2003 | Fennel et al. |
| 6,631,317 B1 | 10/2003 | Lu et al. |
| 6,654,671 B1 * | 11/2003 | Schubert ......................... 701/1 |
| 6,654,674 B1 | 11/2003 | Lu et al. |
| 6,671,595 B1 | 12/2003 | Lu et al. |
| 6,684,140 B1 * | 1/2004 | Lu ............................. 701/37 |
| 2002/0139599 A1 | 10/2002 | Lu et al. |
| 2003/0055549 A1 * | 3/2003 | Barta et al. .................... 701/70 |
| 2003/0065430 A1 | 4/2003 | Lu et al. |
| 2003/0100979 A1 | 5/2003 | Lu et al. |
| 2003/0130775 A1 | 7/2003 | Lu et al. |
| 2003/0130778 A1 | 7/2003 | Hrovat et al. |
| 2004/0046447 A1 | 3/2004 | Wanke et al. |
| 2004/0215384 A1 | 10/2004 | Kummel et al. |
| 2005/0004738 A1 | 1/2005 | Gronau et al. |

* cited by examiner

ACTIVE ROLLOVER PROTECTION

FIELD OF THE INVENTION

The present invention relates generally to stability control systems for motor vehicles, and more particularly relates to active rollover protection for such stability control systems.

BACKGROUND OF THE INVENTION

In recent years, much attention has been paid to the reduction of rollover in motor vehicles, especially in larger vehicles such as sport-utility vehicles (SUV's) which have a relatively high center of gravity. These vehicles may experience friction induced rollover conditions, in which the vehicle can rollover in response to friction forces acting on the vehicle tires without striking an obstacle.

Vehicle rollover is caused by exceeding the critical roll angle for a particular vehicle. The roll angle is the function of the suspension of the vehicle, the vehicle's loading condition and other vehicle characteristics and dynamic conditions. Existing rollover protection systems employ some form of a predictive means in an attempt to predict rollover and therefore prevent the same through corrective action such as vehicle braking, engine throttling or steering intervention. For example, many systems employ a roll rate sensor which directly measures the roll rate of the vehicle. Unfortunately, such roll rate sensors are expensive due to their complicated nature. Further, reliance only on the roll rate may result in reduced precision when evaluating rollover tendencies. Accordingly, there exists a need to provide a rollover protection system and method which improves the precision in predicting and protecting against rollover while eliminating the need for a costly roll rate sensor.

BRIEF SUMMARY OF THE INVENTION

One embodiment of the present invention provides a method for protecting against rollover in a vehicle, the method including the steps of providing an array of linear acceleration sensors and providing a control module to utilize the array of sensors. The array of acceleration sensors are positioned at predetermined locations relative to the center of gravity of the vehicle. The control module includes, among other things, a model of the vehicle dynamics and a model of the array of sensors. An acceleration is detected for each sensor in the array. The roll angle of the vehicle is then estimated based on the detected accelerations, the model of the vehicle dynamics and the model of the sensors. The method then generates a control signal based on the roll angle, and reduces the roll moment of the vehicle based on the control signal.

According to more detailed aspects, the method may further comprise the step of estimating a roll rate based on the detected accelerations, the model of the vehicle dynamics and the model of the sensors. Likewise, the method may further estimate the roll acceleration based on the same accelerations and models. Thus, the control signal may be based on both the roll angle and the roll rate, or alternatively the roll angle, the roll rate and the roll acceleration, thereby increasing the precision of the control signal. The step of estimating a roll angle preferably includes estimating a state vector representing the dynamic conditions of the vehicle. The state vector includes a roll angle, a roll rate, a yaw rate and a lateral velocity of the vehicle.

Each acceleration sensor preferably detects a linear acceleration along a sensor axis positioned relative to the vehicle's coordinate net system. The sensor axis of a least one acceleration sensor is preferably not parallel with any of the longitudinal, lateral and vertical axis comprising the coordinate system. At least one acceleration sensor is preferably not aligned with any of the axis of the coordinate system. Preferably, the method includes the step of transforming the detected accelerations from a sensor coordinate system to a body coordinate system for processing by the control module. Finally, the step of reducing the roll moment includes activating an actuator, the actuator being one or more of a brake control system, an engine control unit, and an active steering system.

Another embodiment of the present invention provides a method for protecting against rollover in a motor vehicle, the vehicle defining a longitudinal axis, a lateral axis, and a vertical axis. The method includes the steps of providing an acceleration sensor positioned along the lateral axis of the vehicle. The sensor is spaced a distance from the center of gravity. An acceleration on the vehicle is detected with the sensor, and a roll acceleration of the vehicle is determined from the detected acceleration and the known position of the sensor. The roll acceleration is integrated to determine a roll rate and a roll angle of the vehicle. A control signal is generated based on the roll angle, the roll rate and the roll acceleration, and the roll moment of the vehicle is reduced based on the control signal.

According to more detailed aspects, the sensor detects a linear acceleration along a sensor axis parallel to the vertical axis. A second acceleration sensor may be positioned along the lateral axis of the vehicle and spaced a second distance from the center of gravity. Preferably, the first and second sensors are spaced on opposite sides of the center of gravity. The method may also include the step of filtering out any portion of the detected acceleration that is not representative of the vehicle rotating about its longitudinal axis. The filtering step includes providing a model of the vehicle dynamics and a model of the sensor.

Another embodiment of the present invention provides a system for protecting against rollover in a vehicle. The system includes an array of linear acceleration sensors, a control module and an actuator. The control module includes a signal adjuster, an estimator, a signal generator, a model of the vehicle dynamics and a model of the array of sensors. The sensors are positioned at predetermined locations relative to the center of gravity of the vehicle, each sensor detecting a linear acceleration along its sensor axis. The signal adjuster receives the detected accelerations and transforms them from a sensor coordinate system to a body coordinate system. The estimator receives the transformed accelerations and estimates a roll angle based on the transformed accelerations, the model of the vehicle dynamics, and the model of the array of sensors. The signal generator generates a control signal when the estimated roll angle indicates a tendency of the vehicle to roll over. The actuator receives the control signal and reduces the roll moment of the vehicle based thereon.

According to more detailed aspects, the model of the vehicle dynamics and the model of the array of sensors allows the estimator to solve for and estimate a state vector representing the dynamic condition of the vehicle based on the transformed accelerations. The state vector preferably includes a roll angle, a roll rate, a yaw rate and a lateral loss to the vehicle. Based on the state vector, additional variables may be solved for, including the roll acceleration. Thus, the control signal may be based on the roll angle, the roll rate, and the roll acceleration. Each acceleration sensor detects a linear acceleration along a sensor axis positioned relative to the vehicle's coordinate system. Preferably, the sensor axis of at least one acceleration sensor is not parallel or aligned with any of the longitudinal, lateral and vertical axis forming the vehicle coordinate system. The actuator may be one of a brake control system, an engine control unit and an active steering system.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
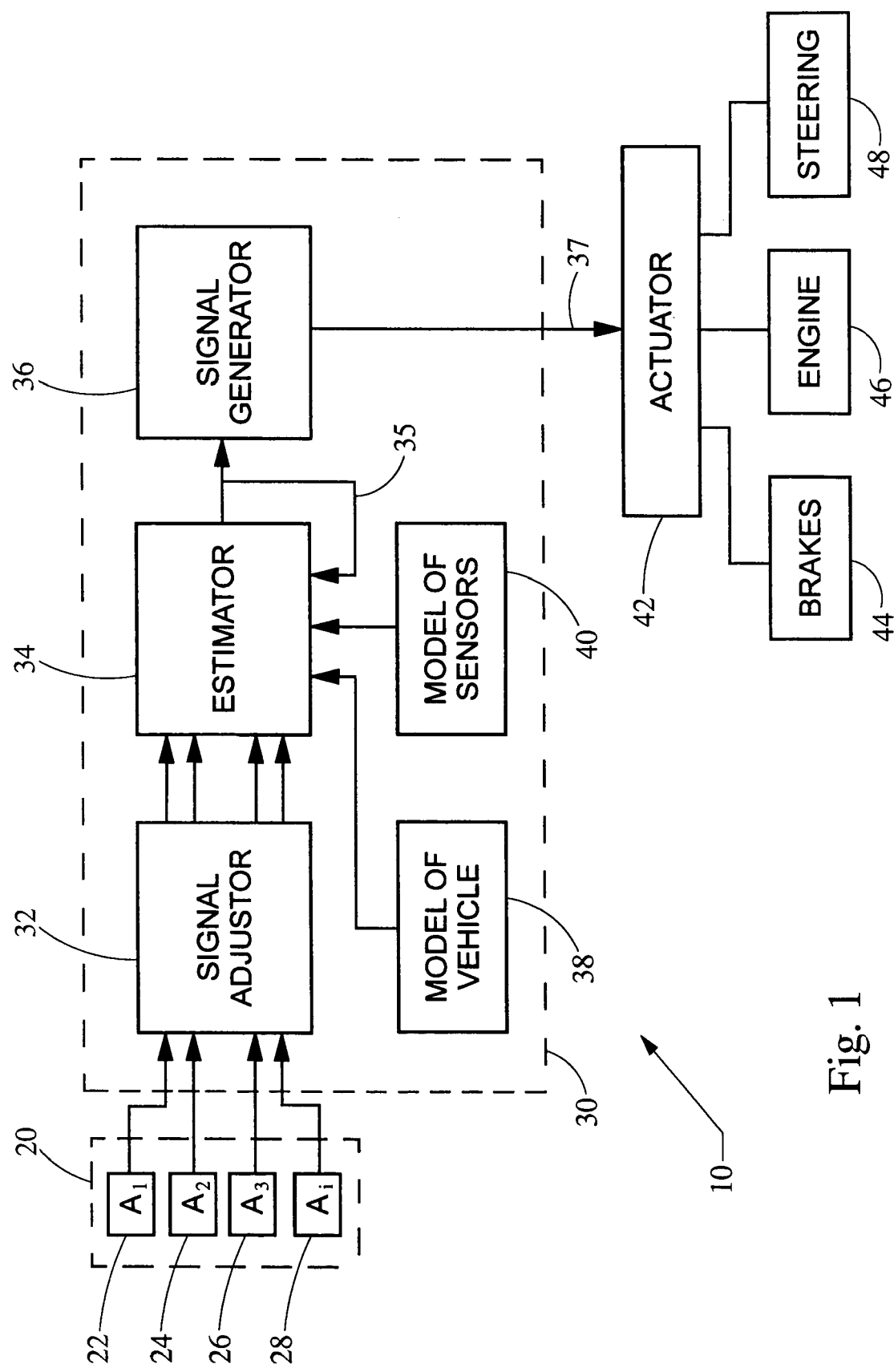
FIG. 1 is a schematic view of an active rollover protection system constructed in accordance with the teachings of the present invention.

Turning now to the figures, FIG. 1 depicts an active rollover protection system 10 constructed in accordance with the teachings of the present invention. The system 10 generally includes an array of acceleration sensors 20, a control module 30, and an actuator 42. The array of sensors 20 detect a set of linear accelerations, which is used by the control module 30 to evaluate the dynamic condition of the vehicle, and in particular the tendency of the vehicle to rollover. If the control module 30 determines there is a tendency of the vehicle to rollover, it sends a signal to the actuator 42, which in turn reduces the rollover moment of the vehicle 70 (FIG. 3) through application of the vehicle brakes or throttling of the engine or by actively controlling the steering of the vehicle.

Figure 3:
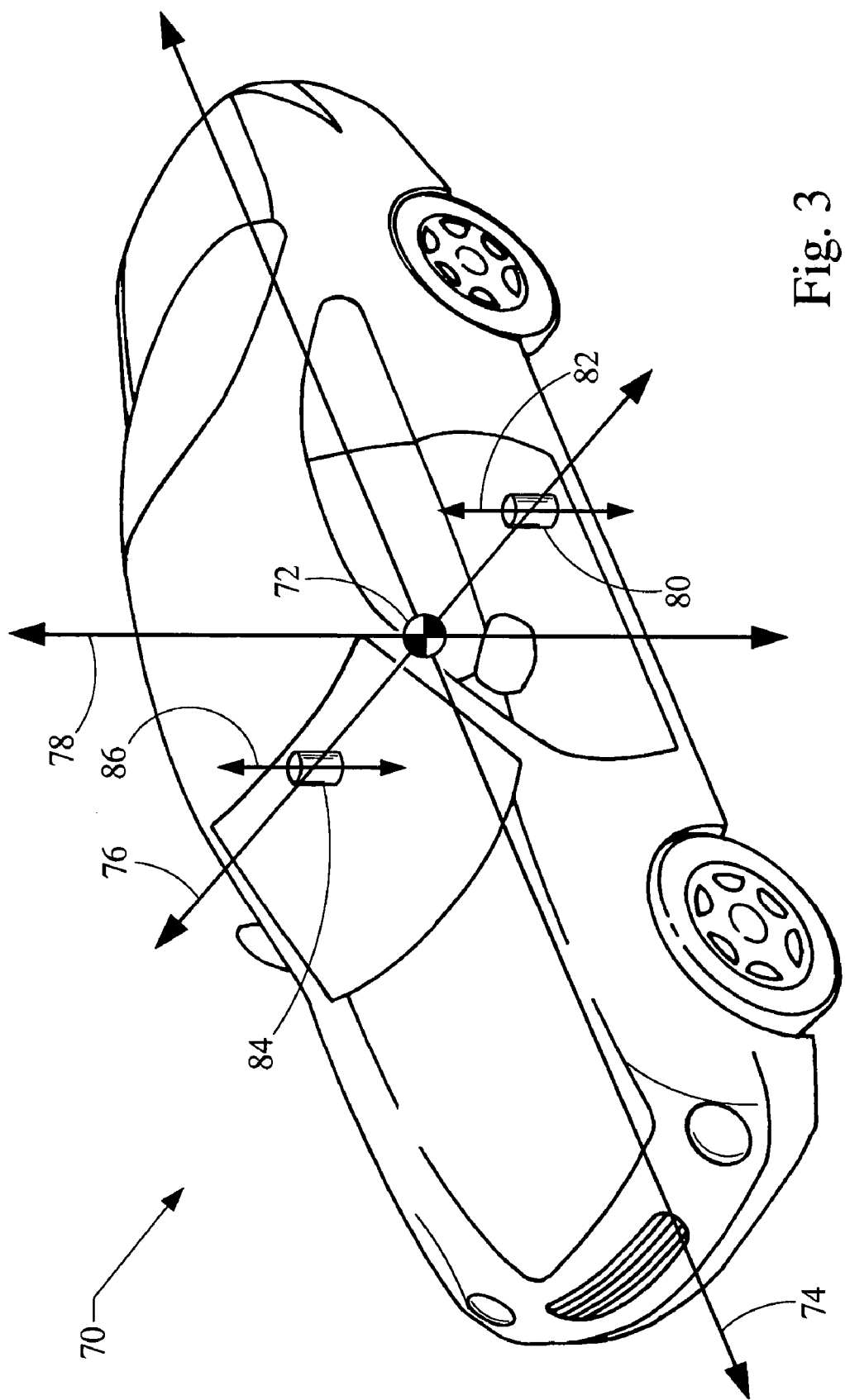
FIG. 3 is a perspective view of a vehicle having the acceleration sensors and the active rollover protection system of FIG. 1.

The array of sensors 20 generally include any number of acceleration sensors such as a $A_1$ 22, $A_2$ 24, $A_3$ 26 up to $A_i$ 28. A simple example of the array of sensors 20 is depicted in FIG. 3. As shown, the vehicle 70 includes a coordinate system comprising a longitudinal axis 74, a lateral axis 76, and a vertical axis 78. Each of the axes extends through a center of gravity 72 of the vehicle. In this special case, a first acceleration sensor 80 is positioned along the lateral axis 76 and spaced a distance away from the center of gravity 72. The acceleration sensor 80 detects a linear acceleration along a sensor axis 82, which is shown parallel to the vertical axis 78. Similarly, a second linear acceleration sensor 84 may be employed. The second acceleration sensor 84 is also positioned along the lateral axis 76, and is oriented to detect accelerations along a sensor axis 86 which is also parallel to the vertical axis 78.

The two acceleration signals can be described by the relationship:

$$A_2 = A_1 - r\_dot \times d_{12} \quad (1)$$

where $A_1$ and $A_2$ are the measured values of the linear acceleration, $d_{12}$ is the distance between the sensors in a plane extending perpendicular to the axis of interest, and $r_{13}$ dot is the angular acceleration of the vehicle body 70 about the axis of interest. Thus, the angular acceleration (roll acceleration) about the longitudinal axis 74 (the axis of interest) can be determined by solving the equation such that $r_{13}$ dot $= (A_2 - A_1)/d_{12}$. When the vehicle 70 is rotating about its longitudinal axis 74 (i.e. rolling) the acceleration sensors 80, 84 will detect accelerations in opposite directions such that, one of the detected accelerations will be negative.

Once the roll acceleration (i.e. the angular acceleration about the longitudinal axis 74) is determined, the acceleration may be integrated to determine the roll rate and the roll angle of the vehicle 70. Based on these values, a control signal can be generated when there is a tendency of the vehicle to roll over, and the actuator 42 (FIG. 1) may take appropriate corrective action.

However, it may not always be possible to mount the acceleration sensors directly along one of the axes 74, 76, 78 or align them in the desired direction. When the sensing devices 22, 24, 26, 28 do not lie in the plane perpendicular to the axis of interest, the measured acceleration values contain biases proportional to the angular rates about other axes. Similarly, when the measurement axes of the sensing devices are not coincident, the measured values contain biases proportional to the angular motion (velocity and acceleration) about other axes. Finally, when the measurement axes of the acceleration sensors 20 are not coincident and not mounted along a body reference axis, the measured accelerations may contain unique gravity biases depending upon the difference in the mounting angle and the angle on which the body may be leaning.

Stated another way, based on the position of an acceleration sensor relative to the center of gravity 72 and the coordinate system 74, 76, 78 of the vehicle 70, and based on the orientation of the sensor axis relative to the coordinate system, the detected linear acceleration of any given sensor may be comprised of different proportions of factors causing such accelerations. For example, the linear acceleration may be comprised of any combination of a yaw acceleration, a pitch acceleration, a roll acceleration, a centripetal acceleration or force due to turning, or a slip acceleration or force due to tire slip. Accordingly, aside from the special case described above, the detected linear accelerations in the array of sensors 20 are likely to represent a variety of different accelerations on the vehicle.

Accordingly, the present invention employs the control module 30 which includes a model of the vehicle dynamics 38 and a model of the sensors 40. With reference to FIG. 1, the detected accelerations from the array of sensors 20 are provided to the control module 30, and more particularly the signal adjuster 32. The signal adjuster 32 transforms the linear accelerations from a sensor coordinate system to the vehicle body coordinate system depicted in FIG. 3. The transformed accelerations are provided to an estimator 34, which is utilized to filter the transformed accelerations to determine the dynamic condition of the vehicle, and in particular a state vector representing the dynamic condition of the vehicle. The state vector generally includes variables for the roll angle, the roll rate, the yaw rate and the lateral velocity of the vehicle.

The specific details and mathematics of the control module 30, and in particular the estimator 34, will not be described herein, but may be found in copending application Ser. No. 10/807,088 filed concurrently with the present application, the disclosure of which is incorporated herein by reference in its entirety. Suffice it to say that the estimator 34 draws from a model of the vehicle dynamics 38 which includes a number of equations to represent the dynamic behavior of the vehicle. Similarly, equations are provided which constitute a model for the sensors 40. Based on detected accelerations from the array of sensors 20 (which are transformed by the signal adjuster 32) the estimator 34 is able to utilize the models 38, 40 to solve for and estimate the state vector of the vehicle. Once the roll rate, yaw rate and lateral velocity of the vehicle are known (i.e. the state vector) additional variables may be solved for utilizing the models 38, 40, such as the roll acceleration. It should also be noted that the estimator 34 may employ a closed loop control system 35 which utilizes the estimate of the state vector and an iterative process to reduce the estimation error to an acceptable level. Further, the array of sensors 20 may also include angular rate sensors which preferably would be mounted offset from the vehicle reference axes, while the model of the sensors 40 would reflect this sensor.

Once the estimator 34 has provided values for the roll angle, roll rate and roll acceleration, the signal generator 36 evaluates those signals for an indication of a tendency of the vehicle to roll over. The signal generator 36 will employ at least the roll angle to generate the control signal 37 which is sent to the actuator 42. However, the signal actuator 36 preferably also utilizes the roll rate, and most preferably utilizes the roll acceleration in generating the control signal. That is, not only will the roll angle of the vehicle be employed, but the rate at which the roll angle is approaching the critical angle, as well as how fast the roll angle is accelerating (or decelerating) towards the critical roll angle may be utilized to determine when there is a tendency of the vehicle to roll over.

Based on the control signal 37, which may indicate a tendency of the vehicle to roll over, the actuator 42 may take corrective action to reduce the roll moment of the vehicle. For example, the actuator 42 may comprise a brake control system such as an active antilock braking system (active ABS) which can be utilized to brake one or more of the vehicle brakes 34 to reduce the roll moment of the vehicle. The actuator 42 may also comprise an engine control unit which would regulate the throttle of the engine 46 in order to reduce speed and the roll moment of the vehicle. Finally, the actuator 42 may comprise an active steering system such as a steer-by-wire system (i.e. where the steering input from the driver are sent electronically to an actuator controlling the direction of the wheels) which can regulate the steering angle 48 to reduce the roll moment of the vehicle.

Figure 2:
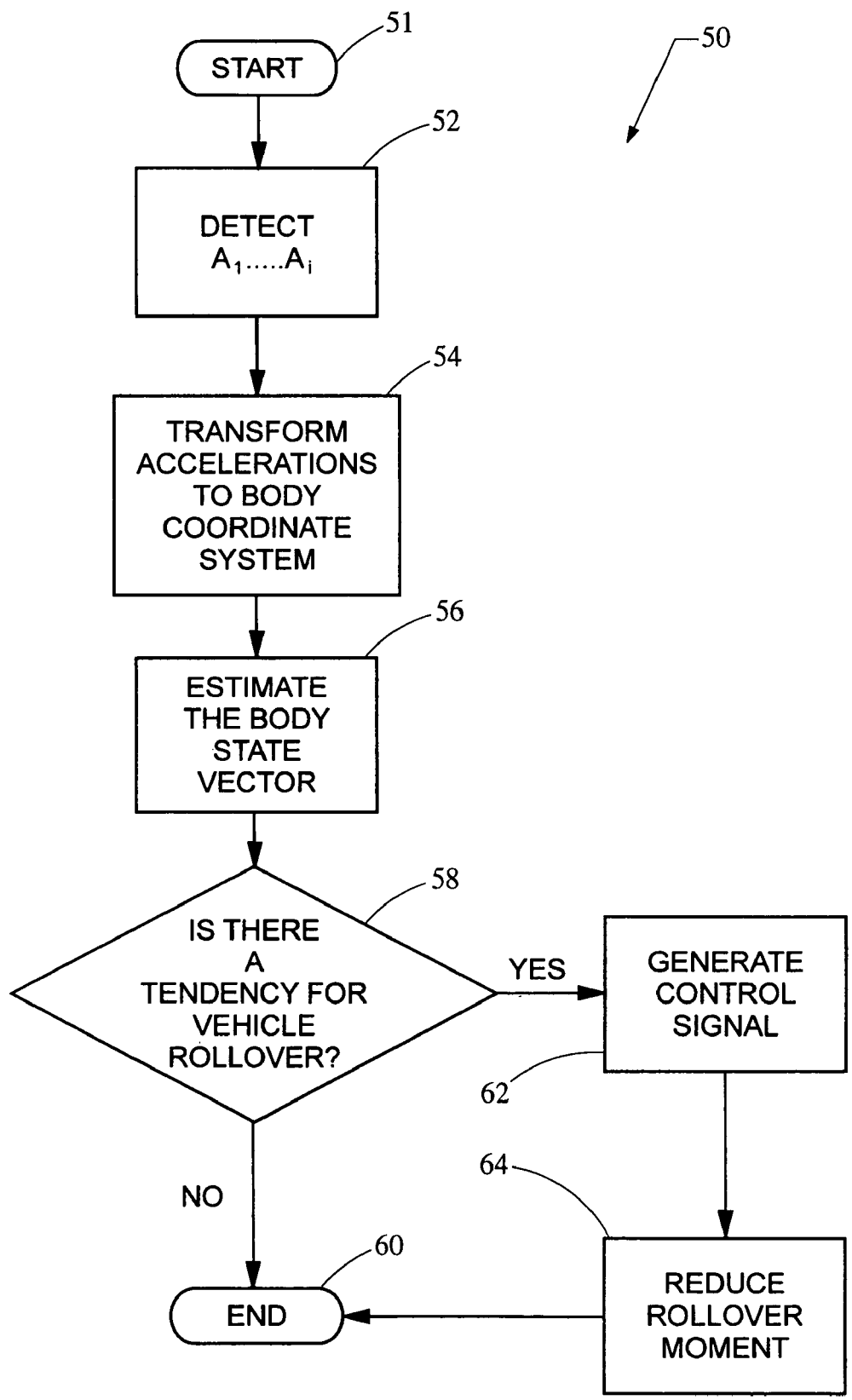
FIG. 2 schematically depicts a method for protecting against rollover utilizing the system depicted in FIG. 1.

As touched on above, the active rollover protection system 10 thus executes a process or method 50 for protecting against rollover, as will be described with reference to FIG. 2. The method 50 begins at block 51, and moves to block 52 where the linear accelerations $A_1, A_2, A_3$ to $A_i$ are detected from the array of sensors 20. The detected accelerations are transformed to the vehicle's body coordinate system by the signal adjuster 32, as indicated at block 54. The estimator 34 then utilizes the transformed accelerations in order to estimate the body state vector, as indicated at block 56. Given the state vector, the signal generator 36 is able to determine whether there is a tendency for the vehicle to roll over, as shown by the decision block 58. If there is no tendency of the vehicle to roll over, the method terminates at block 60. If there is a tendency of the vehicle to roll over, the signal generator 36 will generate a control signal 37, as indicated by block 62. Based on the control signal 37, the actuator 42 will reduce the rollover moment, as shown at block 64 and as previously discussed.

Accordingly, it will be recognized that the present invention provides a system and method for protecting against rollover in a motor vehicle which eliminates the need for costly and complicated roll rate sensors. The array of linear acceleration sensors employed by the present invention are readily available at reasonable costs. One or more of the vehicles' roll angle, roll rate and roll acceleration may be utilized to provide a precise control signal to an actuator to reduce the rollover moment of the vehicle and protect against roll. In a special embodiment of the invention, the roll acceleration may be directly detected and integrated to allow a control signal to be based on roll angle, roll rate, and roll acceleration, improving the precision with which the system and method determine a tendency for rollover and protect against the same.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for protecting against rollover in a motor vehicle comprising the steps of:
   providing an array of linear acceleration sensors at predetermined locations relative to the center of gravity of the vehicle;
   providing a control module having a model of the vehicle dynamics and a model of the array of sensors;
   detecting an acceleration for each sensor in the array of sensors;
   estimating a roll angle of the vehicle based on the detected accelerations, the model of the vehicle dynamics and the model of the sensors;
   generating a control signal based on the roll angle; and
   reducing the roll moment of the vehicle based on the control signal.

2. The method of claim 1, further comprising the step of estimating a roll rate based on the detected accelerations, the model of the vehicle dynamics and the model of the sensors.

3. The method of claim 2, wherein the control signal is based on both the roll angle and the roll rate.

4. The method of claim 2, further comprising the step of estimating a roll acceleration of the vehicle based on the detected accelerations, the model of the vehicle dynamics and the model of the sensors.

5. The method of claim 4, wherein the control signal is based on the roll angle, the roll rate and the roll acceleration.

6. The method of claim 1, wherein the step of estimating a roll angle includes estimating a state vector representing the dynamic condition of the vehicle based on the detected accelerations, the model of the vehicle dynamics and the model of the sensors.

7. The method of claim 6, wherein the state vector includes a roll angle, a roll rate, a yaw rate and a lateral velocity of the vehicle.

8. The method of claim 6, wherein the control signal is based on the estimated state vector.

9. The method of claim 1, wherein each acceleration sensor detects a linear acceleration along a sensor axis positioned relative to the vehicle's coordinate system, the coordinate system including a longitudinal axis, a lateral axis and a vertical axis of the vehicle.

10. The method of claim 9, wherein the sensor axis of at least one acceleration sensor is not parallel with any of the longitudinal, lateral and vertical axes.

11. The method of claim 9, wherein the location of at least one acceleration sensor is not aligned with any of the longitudinal, lateral and vertical axes.

12. The method of claim 9, further comprising the step of transforming the detected accelerations from a sensor coordinate system to a body coordinate system.

13. The method of claim 1, wherein the step of reducing the roll moment includes activating an actuator, the actuator being one or morn of a brake control system, an engine control unit and an active steering system.

14. The method of claim 1, further comprising the step of providing an angular rate sensor.

15. A method for protecting against rollover in a motor vehicle, the vehicle defining a longitudinal axis, a lateral axis, and a vertical axis, each axis passing through the center of gravity of the vehicle, the method comprising the steps of:
providing an acceleration sensor positioned along the lateral axis of the vehicle, the sensor spaced a distance from the center of gravity;
detecting an acceleration on the vehicle with the sensor;
determining a roll acceleration of the vehicle from the detected acceleration and the known position of the sensor;
integrating the roll acceleration to determine a roll rate and a roll angle of the vehicle;
generating a control signal based on the roll angle, the roll rate and the roll acceleration; and
reducing the roll moment of the vehicle based on the control signal.

16. The method of claim 15, wherein the sensor detects a linear acceleration along a sensor axis parallel to the vertical axis.

17. The method of claim 15, further comprising a second acceleration sensor positioned along the lateral axis of the vehicle, the second sensor spaced a second distance from the center of gravity.

18. The method of claim 17, wherein the sensor and second sensor are spaced on opposite sides of the center of gravity.

19. The method of claim 15, further comprising the step of filtering out any portion of the detected acceleration that is not representative of the vehicle rotating about its longitudinal axis.

20. The method of claim 19, wherein the filtering step includes providing a model of the vehicle dynamics and model of the sensor.

21. The method of claim 15, wherein the step of reducing the roll moment includes activating an actuator, the actuator being one or more of a brake control system, an engine control unit and an active steering system.

22. A system for protecting against rollover in a vehicle comprising:
an array of linear acceleration sensors positioned at predetermined locations relative to the center of gravity of the vehicle, each sensor detecting a linear acceleration along its sensor axis;
a control module having a signal adjuster, an estimator, a signal generator, a model of the vehicle dynamics and a model of the array of sensors;
the signal adjuster receiving the detected accelerations and transforming the accelerations from a sensor coordinate system to a body coordinate system;
the estimator receiving the transformed accelerations and estimating a roll angle based on the transformed accelerations, the model of the vehicle dynamics and the model of the array of sensors;
the signal generator generating a control signal when the roll angle indicates a tendency of the vehicle to rollover; and
an actuator receiving the control signal and reducing the roll moment of the vehicle based thereon.

23. The system of claim 22, wherein the estimator further estimates a roll rate of the vehicle based on the transformed accelerations, the model of the vehicle dynamics, and the model of the array of sensors.

24. The system of claim 23, wherein the signal generator generates a control signal based on both the roll angle and the roll rate.

25. The system of claim 22, wherein the estimator further estimates a roll acceleration of the vehicle based on the transformed accelerations the model of the vehicle dynamics and the model of the sensors.

26. The system of claim 25, wherein the signal generator generates a control signal based on the roll angle, the roll rate and the roll acceleration.

27. The system of claim 22, wherein the estimator estimates a state vector representing the dynamic condition of the vehicle based on the transformed accelerations, the model of the vehicle dynamics and the model of the sensors.

28. The system of claim 27, wherein the state vector includes a roll angle, a roll rate, a yaw rate and a lateral velocity of the vehicle.

29. The system of claim 22, wherein each acceleration sensor detects a linear acceleration along a sensor axis positioned relative to the vehicle's coordinate system, the coordinate system including a longitudinal axis, a lateral axis and a vertical axis of the vehicle.

30. The system of claim 29, wherein the sensor axis of at least one acceleration sensor is not parallel with any of the longitudinal, lateral and vertical axes.

31. The system of claim 29, wherein the location of at least one acceleration sensor is not aligned with any of the longitudinal, lateral and vertical axes.

32. The system of claim 22, wherein the actuator is one of a brake control system, an engine control unit and an active steering system.

* * * * *

UNITED STATES PATENT AND TRADEMARK OFFICE
CERTIFICATE OF CORRECTION

| | | |
|---|---|---|
| PATENT NO. | : 7,031,816 B2 | Page 1 of 1 |
| APPLICATION NO. | : 10/806535 | |
| DATED | : April 18, 2006 | |
| INVENTOR(S) | : Kurt Stouffer Lehmann et al. | |

It is certified that error appears in the above-identified patent and that said Letters Patent is hereby corrected as shown below:

In the Claims

Column 7, in claim 13, line 13, after "being one or" delete "morn" and substitute --more-- in its place.

Column 7, in claim 20, line 49, before "model of the sensor" insert --a--.

Signed and Sealed this

Twenty-first Day of November, 2006

JON W. DUDAS
*Director of the United States Patent and Trademark Office*